US009900365B2

(12) United States Patent
Herse et al.

(10) Patent No.: US 9,900,365 B2
(45) Date of Patent: Feb. 20, 2018

(54) PORTABLE DEVICE FOR ACCESSING A SERVER, CORRESPONDING SYSTEM, SERVER AND METHOD

(75) Inventors: Frederic Herse, Mimet (FR); Fabrice Delhoste, Greasque (FR); Frederic Paillart, Aix en Provence (FR)

(73) Assignee: GEMALTO SA, Meudon (FR)

( * ) Notice: Subject to any disclaimer, the term of this patent is extended or adjusted under 35 U.S.C. 154(b) by 486 days.

(21) Appl. No.: 13/808,467

(22) PCT Filed: Jul. 5, 2011

(86) PCT No.: PCT/EP2011/061319
§ 371 (c)(1),
(2), (4) Date: Mar. 21, 2013

(87) PCT Pub. No.: WO2012/004265
PCT Pub. Date: Jan. 12, 2012

(65) Prior Publication Data
US 2013/0173759 A1 Jul. 4, 2013

(30) Foreign Application Priority Data

Jul. 6, 2010 (EP) ..................................... 10305747

(51) Int. Cl.
| G06F 15/16 | (2006.01) |
| H04L 29/08 | (2006.01) |
| G06F 21/34 | (2013.01) |
| H04W 4/00 | (2018.01) |
| H04W 4/20 | (2018.01) |

(Continued)

(52) U.S. Cl.
CPC ............ *H04L 67/02* (2013.01); *G06F 21/34* (2013.01); *H04W 4/003* (2013.01); *H04W 4/20* (2013.01); *H04W 12/06* (2013.01); *H04L 63/0846* (2013.01); *H04L 63/0853* (2013.01)

(58) Field of Classification Search
CPC ............. H04L 63/0853; H04L 63/0428; H04L 63/061; H04L 2463/061; H04L 9/00; H04L 67/02; H04L 63/0846; H04M 1/72547; H04M 1/72561; H04M 2250/14; H04W 4/12; H04W 4/003; H04W 4/20; H04W 12/06; G06F 21/34; G06F 2221/2115
See application file for complete search history.

(56) References Cited

U.S. PATENT DOCUMENTS

| 2001/0045451 A1* | 11/2001 | Tan ........................ G06F 21/33 235/375 |
| 2003/0037065 A1* | 2/2003 | Svab ......................... 707/104.1 |

(Continued)

FOREIGN PATENT DOCUMENTS

| DE | 10 2004 044 454 A1 | 3/2006 |
| DE | 10 2007 026 870 A1 | 12/2008 |

OTHER PUBLICATIONS

International Search Report (PCT/ISA/210) dated Aug. 12, 2011, by the European Patent Office as the International Searching Authority for International Application No. PCT/EP2011/061319.

*Primary Examiner* — Cheikh Ndiaye
(74) *Attorney, Agent, or Firm* — Buchanan Ingersoll & Rooney PC (57) ABSTRACT

The invention relates to a portable device for accessing a server. According to the invention, the device is adapted to send to a server or data relating to rights for accessing a server. The invention also relates to corresponding system, server and method.

15 Claims, 1 Drawing Sheet

(51) Int. Cl.
*H04W 12/06* (2009.01)
*H04L 29/06* (2006.01)

(56) References Cited

U.S. PATENT DOCUMENTS

| | | | |
|---|---|---|---|
| 2003/0051173 A1 | 3/2003 | Krueger | |
| 2003/0158891 A1 | 8/2003 | Lei et al. | |
| 2005/0050437 A1* | 3/2005 | Giraud | G06F 21/6245 715/255 |
| 2006/0282678 A1* | 12/2006 | Ali et al. | 713/185 |
| 2008/0062893 A1* | 3/2008 | Bloebaum | H04L 12/66 370/260 |
| 2008/0109362 A1* | 5/2008 | Fransdonk | 705/51 |
| 2008/0142586 A1* | 6/2008 | Hugot | H04M 1/2745 235/380 |
| 2008/0244720 A1 | 10/2008 | Bartsch et al. | |
| 2008/0280644 A1* | 11/2008 | Hugot | H04L 63/0853 455/556.2 |
| 2008/0320577 A1* | 12/2008 | Larduinat | G06F 21/34 726/9 |
| 2010/0217799 A1* | 8/2010 | Heider et al. | 709/203 |
| 2011/0263296 A1* | 10/2011 | Baietto | G06F 8/60 455/558 |

* cited by examiner

PORTABLE DEVICE FOR ACCESSING A SERVER, CORRESPONDING SYSTEM, SERVER AND METHOD

FIELD OF THE INVENTION

The invention relates, in a general manner, to a portable device for accessing a server.

Within the present description, a portable device is an electronic smart object that is intended to communicate with the outside world.

Furthermore, the invention pertains to a system for accessing a server.

Moreover, the invention relates to a server.

Finally, the invention pertains to a method for accessing a server.

STATE OF THE ART

A known solution for accessing a server is based upon a log of a user of a Personal Computer (or PC) on to a (web) server by transmitting user information, for example, a login and/or a password from the PC to the server. The server verifies whether the transmitted user information matches expected information that is stored at the server side. If there is a matching, then the server authorizes the user to access an application that is executed by the server. Otherwise, the server rejects the user access.

However, such a known solution implies that the user is involved. Moreover, the user has to remember the user information each time she or he desires to access the server.

Thus, there is a need to facilitate, for a user, an access to a server while keeping a secure access.

SUMMARY OF THE INVENTION

The invention proposes a solution for satisfying the just hereinabove specified need by providing a portable device for accessing a server.

According to the invention, the device is adapted to send to a server data relating to rights for accessing a server.

The principle of the invention consists in using a portable device for initializing an access to a server by sending rights for accessing a server.

The invention solution makes it possible to initialize a communication session between a portable device user and a server.

An exchange of rights for accessing a server between the portable device and a server does not require to involve a portable device user.

The user of the portable device does not need to type user information to be used to access a server.

Accordingly, contrary to the known solution that is described supra, the proposed solution does not require that the user is involved to access a server. Thus, the user of the portable device does not have to remember, each time she or he desires to access a server, user information to be used for accessing a server.

The server to be accessed may be local or remote with respect to the portable device.

A user of the invention portable device may use the portable device anywhere and anytime, so as to access a server to be accessed in a simple and convenient manner.

The management by the portable device of data to be submitted to a server thus facilitates the access to a server to be accessed and is therefore convenient and user-friendly.

The portable device may be a terminal or a token.

As terminal, it can be any device including means for processing data, means for sending to and/or receiving data from outside, comprising or being connected to means for interfacing with a user, such as a loudspeaker and/or a display screen, and comprising or being connected to means for storing data.

For example, the terminal may be a mobile telephone, a smart telephone, a Personal Digital Assistant (or PDA), a mobile laptop, a PC, a set-top box, a portable TeleVision (or TV) and/or a netbook.

As token, it can be any electronic device comprising means for processing data, means for sending to and/or receiving data from outside, and comprising or being connected to means for storing data.

The token is any electronic medium that may have different form factors. The token can constitute any electronic medium.

For example, the token can be embodied within a smart card, a Secure Digital (or SD) type card, a Multi-Media type Card (or MMC), a smart dongle of the USB (acronym for "Universal Serial Bus") type, or a chip to be fixed to a user terminal, as host device, possibly in a removable manner.

According to a further aspect, the invention is a system for accessing a server. The system comprises a host device and a portable device. The portable device is coupled to the host device.

According to the invention, the portable device is adapted to send, through the host device, to a server data relating to rights for accessing a server.

In other words, the portable device has to cooperate with a host device, so as to communicate with a server to allow an access to a server to be accessed. In such a case, the portable device involves a host device, as an intermediary entity, to benefit from its capacity to communicate with a server to allow an access to a server to be accessed.

According to another aspect, the invention is a server.

According to the invention, the server is adapted to receive, from a portable device, data relating to rights for accessing a server.

According to still an additional aspect, the invention is a method for accessing a server.

According to the invention, a portable device sends to a server data relating to rights for accessing a server.

BRIEF DESCRIPTION OF THE DRAWINGS

Additional features and advantages of the invention will be more clearly understandable after reading a detailed description of one preferred embodiment of the invention, given as one indicative and non-limitative example, in conjunction with the following drawings.

DETAILED DESCRIPTION

Herein under is considered an invention embodiment in which the invention portable device is a smart card that is coupled to a mobile telephone, as a host device.

For example, instead of being constituted by a smart card, the portable device may be constituted by a dongle, a USB smart card, and/or any other electronic medium that may have different form factors.

According to still other examples, the portable device may also be a chip fixed, possibly in a removable manner, to a host device, or an embedded Secure Element, as a chip to be soldered within a host device.

Likewise, instead of being constituted by a mobile telephone, the host device may be constituted, for example, by a set-top box, a PC, a desktop computer, a laptop computer, a media-player, a game console, a handset, a smart phone, a netbook and/or a PDA.

However, the invention method for accessing a server may be implemented by a user terminal or a token, as a portable device for accessing a server. In other words, according to such two embodiments (not represented), the user terminal or the token does not cooperate with any token or any terminal respectively, so as to access a server. According to such two embodiments, the terminal or the token, as a standalone entity, is adapted, so as to exert, on its own, the functions that are carried out by the token and the terminal, as hereinafter described. In particular, the terminal or the token is provided with an antenna(s) that is configured to exchange data, through a short and/or long range radio-frequency link(s), with a remote server.

Naturally, the herein below described embodiment is only for exemplifying purposes and is not considered to reduce the scope of the present invention.

Figure 1:
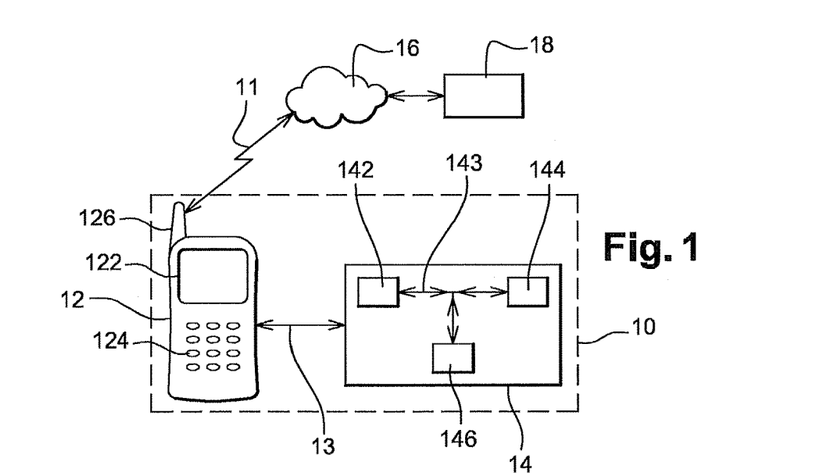
FIG. 1 represents a simplified diagram of one exemplary embodiment of a system for accessing a server, the system comprising a smart card, as portable device, and a mobile telephone, as host device, the system being adapted, to transmit from the portable device to a remote server data relating to rights for accessing the remote server.

FIG. 1 schematically shows a mobile assembly 10 that is to be connected to a mobile radio-communication network 16 and a remote (Web) server 18.

The mobile assembly 10, as an electronic communication system, includes a mobile telephone 12, as a hand-held appliance and user terminal, and a Universal Integrated Circuit Card (or UICC) type smart card 14, as a token.

For a sake of clarity and conciseness, the mobile telephone 12 and the UICC type smart card 14 are termed hereinafter the phone 12 and the card 14 respectively.

The mobile radio-communication network 16 may be connected to the Internet network.

Alternately, instead of a mobile radio-communication network, the user terminal is connected, via a wire communication network, to the remote server 18.

The mobile radio-communication network 16 is linked, via a bi-directional wired line 17, to the remote server 18.

According to an alternative, instead of a mobile radio-communication network, a network between the phone 12 and the remote server 18 is constituted by an Internet network which may be accessible from the phone 12 through a wireless link, such as a Bluetooth link, a Wifi link or the like.

The remote server 18 may be operated or managed by a Mobile Network Operator (or MNO), a Mobile Virtual Network Operator (or MVNO), a banking Operator, a wire communication network operator, or any service Operator or on behalf of a service Operator, as a service provider.

The remote server 18 is to be accessed by a user of the mobile assembly 10.

Alternatively, instead of a remote server, a local server, i.e. embedded within the card 14 (or the phone 12), is to be accessed.

According to the invention, the remote server 18 to be accessed has to be accessed through an initiation from or through the card 14, by using a key(s), as data relating to rights for accessing the remote server 18. The key(s) are known only to the card 14 and/or the remote server 18 to be accessed.

Optionally, the remote server 18 executes one or several security functions. The security functions include preferentially a decryption/encryption process to be used after receiving, through the phone 12, from the card 14, a command with data relating to rights for accessing the remote server 18 and/or before sending data, as response to the sent command, so as to protect an access to the data exchanged between the remote server 18 and the card 14.

The phone 12 includes at least one microprocessor (not represented), at least one memory (not represented) and at least one Input/Output (or I/O) interface.

The phone memory stores data, an Operating System (or OS) and at least one application. As application, there is preferably at least a (Web) browser, so as to access a (Web) server. As server, there is a local (Web) server embedded within the card 14. The local server lists at least one application supported by the card 14.

The phone memory stores a clock recovery mechanism with which a time(s) is(are) determined. In particular, when the clock recovery mechanism has a time period value, as input, the corresponding time, namely the time period value added with the time at which the clock recovery mechanism received the time period value, is calculated.

The phone microprocessor processes data originating from the phone memory or the phone I/O interface.

The phone microprocessor executes preferably the Web browser, so as to interact with the application(s) supported by the card 14 and offered to the phone user.

The phone 12 is preferably arranged to connect, through a mobile radio-communication network 16, to the remote server 18, thanks to data provided by the card 14, for example, a Uniform Resource Locator (or URL) relating to the remote server 18 to be accessed.

The phone I/O interface includes an interface(s), so as to exchange data with the card 14. The interface with the card 14 may be an International Standard Organisation (or ISO) 7816 interface, as a contact interface when the card 14 is lodged within the phone 12.

The phone I/O interface with the card 14 may be constituted by an ISO 14 443 interface, as a contact-less interface when the card 14 is outside of the phone 12.

The phone I/O interface comprises preferably a display screen 122, a keyboard 124, and one antenna 126 (or several antennas).

The display screen 122 and the keyboard 124 may be used for exchanging information between a phone user and the phone 12 or another entity(ies) to which the phone 12 is connected, like the card 14, and/or the remote server 18 to be accessed.

The antenna 126 is arranged to let communicate, through a long range radio-frequency link 11, notably the card 14 and the remote server 18 (through the phone 12).

The card 14 is intended to interact with the phone 12, in order to connect, via the mobile radio-communication network 16, to the remote server 18.

The card 14 is connected to the phone 12 via a bi-directional link 13.

The card 14 is a smart object that has computing means with a processing that is limited, in terms of performance, with respect to the one relating to a PC, the phone 12 or the like.

The card 14 includes a chip comprising at least one microprocessor 142, as means for processing data, at least one memory 144, and at least one I/O interface 146 which are all linked together through a control and data bus 143.

The card 14 stores, preferably within a non-volatile part of the memory 144, besides a card Operating System (or OS), a key generation algorithm(s) for generating data relating to rights for accessing the remote server 18, and an application algorithm relating to a process, according to the invention, for accessing the remote server 18 to be accessed, such as an application written in an object-oriented language, such as Java, also termed applet when developed in Java.

According to such a corresponding embodiment, the card memory 144 has a Java Virtual Machine (or JVM) that interprets and executes the applet.

Optionally, the memory 144 stores a validity time period generation algorithm for generating a validity time period value during which a communication session involving the server to be accessed and the browser is valid, i.e. once the time period value from a precise time to be determined has expired, the communication session is terminated. In other words, another time period value has to be generated, so as to be able to let communicate once again the server to be accessed and the browser.

The memory 144 can be constituted by one or several EEPROM (acronym for "Electrically Erasable Programmable Read-Only Memory"), one or several ROM (acronym for "Read Only Memory"), one or several Flash memories, and/or any other memories of different types, like one or several RAM (acronym for "Random Access Memory").

The card 14 preferably stores securely, within its memory 144, an International Mobile Subscriber Identity (or IMSI), as a unique number associated with all Global Service for Mobiles (or GSM), Universal Mobile Telecommunications System (or UMTS), Code Division Multiple Access (or CDMA) and/or Long Term Evolution (or LTE) type network(s) mobile phone users.

The mobile radio-communication network 16 may be a GSM, UTRAN (acronym for "UMTS Terrestrial Radio Access Network"), EDGE (acronym for "Enhanced Data Rates for GSM Evolution"), GPRS (acronym for "General Packet Radio System"), WLAN (acronym for "Wide Local Area Network") CDMA and/or LTE network(s).

The mobile radio-communication network list is not exhaustive but only for exemplifying purposes and is not considered to reduce the scope of the present invention.

The IMSI is used to identify a subscriber in relation to one or several mobile radio-communication networks.

The card 14 can store, within its memory 144, for example, a SIM application for a GSM network, a Universal Subscriber Identity Module (or USIM) for a UMTS network, a CDMA Subscriber Identity module (or CSIM) for a CDMA network, a Removable User Identity Module (or RUIM) for GSM, UMTS and CDMA networks, and/or an Internet protocol multimedia Services Identity Module (or ISIM) for IP Multimedia Subsystem (or IMS).

Naturally, the just aforementioned list is not exhaustive but only for exemplifying purposes and is not considered to reduce the scope of the present invention.

The memory 144 preferably stores, in a secure manner, a first URL relating to a local server (not represented) embedded within the card 14 and a second URL relating to the remote server 18 to be accessed.

Figure 2:
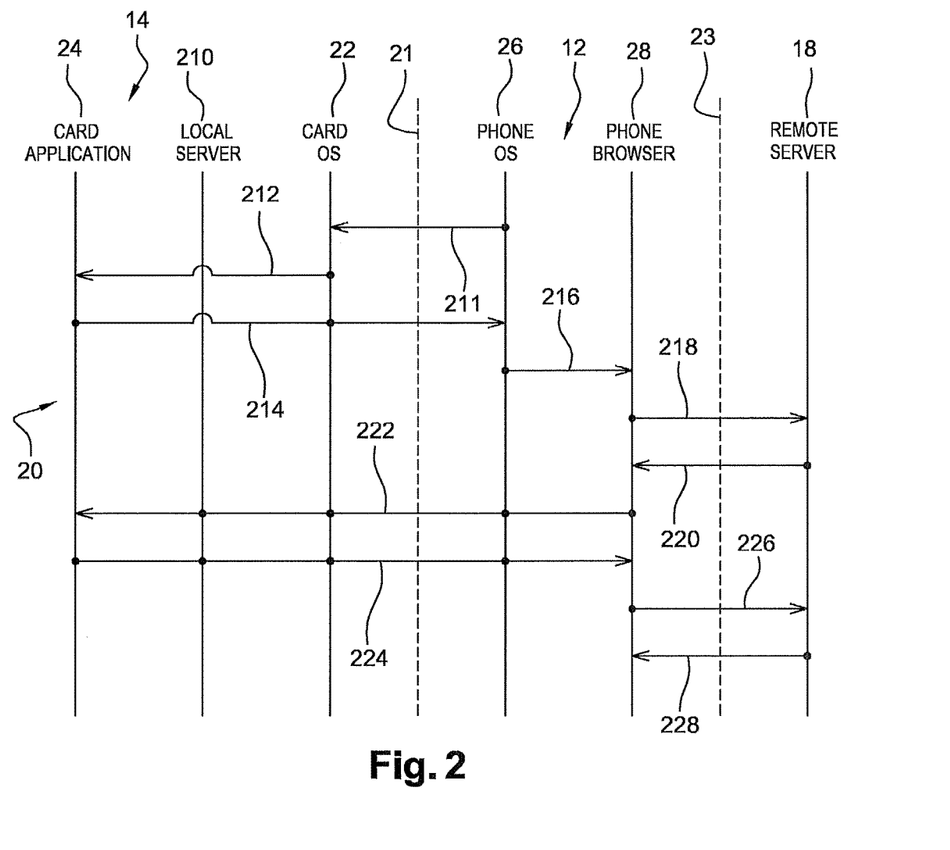
FIG. 2 represents an example of one message flow notably between the host device and the portable device within the system of FIG. 1, so as to use the portable device, as a trigger of a session of a communication between the host device and the remote server to be accessed.

As further explained infra in relation to FIG. 2, for the described embodiment, the local server is used, as an intermediary element, for communicating with the remote server 18 to be accessed.

Alternately, the memory 144 stores, in a secure manner, a single URL relating to a server to be accessed. The server to be accessed is either local or remote.

In another alternative, a user enters or selects a URL of the server to be accessed.

In still another alternative, a URL of the server to be accessed is provided with a message, such as a Short Message Service message or an email, originating from an element of the mobile radio-communication network 16 and/or a server connected to the mobile radio-communication network 16.

The card microprocessor 142 controls and communicates with all the components of the card chip, such as the memory 144 to read it and possibly write into it. The microprocessor 142 controls a data exchange, through the I/O interface 146, with outside, notably the phone 14.

The card microprocessor 142 preferentially executes, besides the card OS, the key generation algorithm(s), so as to generate a key(s), as data relating to rights for accessing a server(s).

The key generation algorithm or one key generation algorithm (when there are several key generation algorithms) is, for example, a random number generation algorithm.

The key is used for exchanging with a server(s) to be accessed in a secure manner.

The card 14 sends the generated key to the server to be accessed.

The generated key may be a random number, an encrypted number corresponding to a login and/or password associated with a card user to be submitted to a server to be accessed.

The generated key may be shared with the server(s) to be accessed.

The generated key may be verified by the server to be accessed.

The card microprocessor 142 also executes the application algorithm.

The card microprocessor 142 executes preferably security functions, in order to protect an access to information managed through and/or by the card 14.

The security functions include preferably a user authentication process to be used, in order to access the server to be accessed. To authenticate the user, the card 14 may store an application for verifying a Personal Identity Number (or PIN). The PIN is securely stored by the card 14 and to be input by the card 14 user, so that the card 14 compares the input data with the stored PIN and, when the input data matches the stored PIN, authorizes a running of the application algorithm.

The security functions include preferentially an encryption/decryption process. The encryption/decryption process is to be used before sending, through the phone 12, to the remote server 18, a command with data relating to rights for accessing the remote server 18, and/or after receiving from the remote server 18 data, as response to the sent command, so as to protect an access to the data exchanged between the card 14 and the remote server 18.

The card I/O interface 146 is used for receiving data from or sending data to outside, namely with at least the phone 12, through a corresponding phone I/O interface, via the bi-directional communication link 13.

The card I/O interface 146 includes preferably an ISO 7816 interface, so as to let communicate the card 146 and the phone 12.

According to one particular embodiment, the card I/O interface 146 comprises at least one Application Protocol Data Unit (or APDU) communication channel.

The card I/O interface 146 may comprise another or other communication channel(s), such as an Internet Protocol (or IP) communication channel, a Mass Storage communication channel, and/or a Universal Serial Bus (or USB) communication channel in compliance with the USB standard specifications.

The communication between the card 14 and the phone 12 is used in particular to benefit from the Man Machine Interface (or MMI) of the phone 12 and/or an access to the mobile radio-communication network 16 to which the phone 12 may be connected.

The card 14 is able to initiate actions, in order to interact directly with the outside world, in an independent manner of the phone 12 and the mobile radio-communication network. Such a capacity of interaction at the initiative of the card 14 is also known as proactive capacity.

The card 14 is adapted to send, at its own initiative, to the phone 12 a proactive command for launching an application, for example a Web browser, when the card 14 receives from the phone 12, as host device, a command, such as a request for accessing an application supported by the card 14, or an event, like an information about the power-up of the phone 12.

FIG. 2 depicts an example of a message flow 20 that involves the card 14, the phone 12, and the remote server 18.

A first dotted line 21 separates different software elements that are executed at the card 14 side from other software elements that are executed at the phone 12 side or at a remote server 18 side.

The card 14 software elements are present on the left side of the first dotted line 21.

The phone 12 software elements are present between the first dotted line 21 and a second dotted line 23.

The remote server 18 software element executed by the remote server 18 is present on the right side of the second dotted line 23.

The phone 12, as a terminal hosting the card 14, has been powered on.

Preferably, the card user has been authenticated by the card 14, for example, the card 14 has verified that data given, as a PIN, by the card user matches the PIN stored within the card memories 14.

It is assumed that the card user desires to access a remote server 18, as a service provider and a server to be accessed.

The use of the card 14 allows discussing, through a local server, as a first server embedded within the card 14, with the remote server 18, as a second server.

It is further assumed that the message flow 20, that is further described herein after, constitutes a configuration phase involving the card 14, the browser 28 and the remote server 18. After such a configuration phase, a further communication phase (not represented) between the remote server 18 and the browser 28 may take place.

According to an interesting feature of the invention, to access the remote server 18, the card 14 is involved while receiving data 211 through or from the phone 12 to launch a browser.

For example, the card user depresses a button or a set of buttons of the phone keyboard that matches an access to an application comprised within a SIM Toolkit menu or a local server implemented by the card 14.

According to another embodiment, instead of a depressing of button(s), the phone 12 informs the card 14 by sending this latter an event, such as the phone 12 has just received a message, like a SMS message or a boot event. More exactly, the phone OS 26 sends to the card OS 22 corresponding data 211, as an event, a SIM Toolkit command or the like.

The event, the SIM Toolkit command or the like that originates from or through the phone 12 and addresses the card 14 may be a terminal profile event, a timer expiration event, an envelope menu selection, such as an envelope command for receiving an incoming SMS message, a power-up signal of the card 14 or other data originating through or from the phone 12.

It is noteworthy that the event, the SIM toolkit command or the like to be received and processed by the card 14 is intrinsically secured by the card 14. As a matter of fact, an access to the card application 24 for accessing a server is controlled by the card 14. The card application 24 for accessing a server is therefore not directly addressable from outside of the card 14. Only a card administrator and/or a card operator is(are) allowed to access the card application 24 for accessing a server. To access the card application 24 for accessing a server, a requester has to use predetermined rights that are shared with the card 14 and stored within the card 14. The requester sends to the card 14 data, as rights. Then, the card 14 checks whether the received data matches with the predetermined rights. When the data matches the predetermined rights, the card 14 grants the requester access to the application 24 for accessing a server.

The card 14 receives the data 211 from the phone 12, as an event, a SIM Toolkit command or the like.

The card 14 interprets this received data and triggers a sending of a corresponding command for requesting an access to the remote server 18.

More exactly, a card OS 22 sends to the application 24 for accessing a server, a command 212 for executing the application for accessing a server.

According to another embodiment (not represented), instead of a sending of the command 212 for executing the application for accessing a server from the card OS 22, a phone (web) browser 28 sends, through a card server, as a local server 210, to the application 24 for accessing a server, a command for executing the application for accessing a server, such as "HTTP" (acronym for "HyperText Transfer Protocol") "GET", accompanied with a parameter for selecting and launching an application 24 for accessing a server embedded within the card 14 and another parameter relating to a URL related to the remote server 18 to be accessed.

According to such other embodiment, before sending the command for executing the application for accessing a server, the browser 28, as Graphical User Interface (or GUI), sends to the remote server 18 a command for accessing a remote server 18, such as "GET/index HTML", accompanied with a URL relating to the remote server 18, as a request. The browser 28 receives, in response to the request, from the remote server 18, a page including executable data, such as a Javascript, for launching an execution of an application 24 for accessing a server.

The browser 28 exchanges preferentially with the remote server 18, by implementing preferably an HTTP.

Alternately, instead of implementing an HTTP, the browser 28 and the remote server 18 to be accessed may implement an HyperText Transfer Protocol Secure (or HTTPS), so as to provide encryption and secure identification of the remote server 18.

The command 212 for executing the application for accessing a server triggers, in a secure way, an execution of the application 24 for accessing a server. As a matter of fact, the application 24 for accessing a server is under control of either the card OS 22 or the local server 210. In other words, the application 24 for accessing a server is accessible only by the card 14 itself, i.e. under control of the card 14 and is not directly addressed by any other external entity, like the phone 12 or the remote server 18.

Then, the card 14 executes the application 24 for accessing a server.

Optionally, the card application 24 for accessing a server authenticates the card user, so as to increase the security level for accessing the remote server 18. To authenticate the card user, for example, the card 14 verifies that data input by the card user effectively matches the PIN or the finger print of the card user previously defined by the card user and stored within the card 14.

When executing the application 24 for accessing a server, the card 14 executes a first key generation algorithm, so as to generate a first key, as data relating to rights for accessing the remote server 18 to be accessed in a secure manner.

The application 24 for accessing a server is able to authenticate the browser 28 and/or the remote server 18, as its interlocutor(s), before authorizing or forbidding the browser 28 and/or the remote server 18 to go further in a communication session to be initiated and involving the browser 28 and the remote server 18.

Optionally, the application 24 for accessing a server generates a validity time period value during which the communication session between the browser 28 and the remote server 18 is allowed to be valid.

Once the card application 24 for accessing a server has generated the first key, the application 24 for accessing a server stores the generated first key and sends, through the card OS 22, to the phone 12, and more exactly the phone OS 26, a command 214 for launching a Web browser.

Such a command 214 for launching a Web browser includes, on the one hand, a first URL relating to the local server 210 implemented by the card 14 and a second URL relating to the remote server 18 and, on the other hand, the first key and possibly the validity time period value.

For example, the validity time period value is one hour.

The local server 210 plays a role of a proxy server, namely a server that allows clients to make indirect connections. The local server 210 is an intermediary entity between the application 24 for accessing a server, as an internal client (i.e. inside the card 14), and the browser 28, as an external client (i.e. outside the card 14).

Alternatively, when the card application 24 for accessing a server has generated the first key and the server to be accessed is a remote server, the card 14 has, for example, previously sent to the remote server a message comprising the first key possibly, in an encrypted manner. The encryption may be performed by using an encryption key known to the card application 24 for accessing a server and the remote server to be accessed, such as a public key relating to the server to be accessed.

Then, the phone OS 26 sends to the browser 28 executed by the phone 12 a command 216 for triggering an execution of the browser 28, such as "Start Browser". Such a command 216 comprises the first URL relating to the local server 210, the second URL relating to the remote server 18, the first key and possibly the validity time period value.

The phone browser 28 receives and processes the command 216 for triggering an execution of the browser 28 originating from the phone OS 26.

Then, the browser 28, as a bridge between the card application 24 for accessing a server and the remote server 18 to be accessed, sends to the remote server 18 a request 218 for downloading data relating to the remote server 18 accompanied with the first URL relating to the local server 210, the second URL relating to the remote server 18, the first key, as data relating to rights for accessing the remote server 18, and possibly the validity time period value, as parameters.

It is to be noted that the browser 28 sends the request 218 for downloading data relating to the remote server 18 accompanied with parameters, via the phone OS 26 (not represented), to the remote server 18.

The request 218 for downloading data relating to the remote server 18 is, for example, a "HTTP GET" type command including the parameters, namely the first URL relating to the local server 210, the second URL relating to the remote server 18, the first key, as data relating to rights for accessing the remote server 18, and possibly the validity time period value.

For example, the parameters of the request 218 for downloading data relating to the remote server 18 are "www.XXX.YYY/initsecure.html?urll=<local URL>&urlr=<remote URL>&ran=<first key>&val=<validity time period value>"

where:

"XXX" is a name of the remote server 18 to be accessed;

"YYY" is a name of the domain hosting the remote server 18 to be accessed;

"/initsecure.html" is a name of the card application 24 for accessing the server that is addressed;

"urn" is a name of a parameter relating to the local server 210;

"=<local URL>" is a value allocated to the parameter relating to the local server 210;

"&" is data related to a semantic for adding a further parameter(s);

"urlr" is a name of a parameter relating to the remote server 18;

"=<remote URL>" is a value allocated to the parameter relating to the remote server 18;

"ran" is a name of a parameter relating to the first key;

"=<first key>" is a value allocated to the parameter relating to the remote server 18;

"val" is a name of a parameter relating to the validity time period value;

"=<validity time period value>" is a value allocated to the parameter relating to the validity time period value.

The remote server 18 generates preferably a cookie, as a second key and data relating to rights for accessing the remote server 18.

The cookie is an information bit string.

To generate a cookie, the remote server 18 may use a random number generation algorithm.

The cookie keeps, in an inherent manner, an identifier of its addresser. Once the cookie has been generated by the remote server 18, the cookie originating from the addresser is usable. Otherwise, the remote server 18 rejects an access to a requester which does not provide the cookie.

The cookie is used as an evidence allowing to authenticate the browser 28, as an interlocutor of the remote server 18.

The cookie may consist of one (or a plurality of) name-value pair(s) comprising information bits, like an identifier relating to a communication session involving the remote server 18 and the browser 28.

The cookie is non-executable data.

The cookie is not presented, through the browser 28, to the card user.

The remote server 18 integrates the generated cookie within a message to be sent to the browser 28, as an HTTP header, during a communication session with the browser 28. The browser 28 stores the generated cookie and sends back to the remote server 18 the generated cookie, in an unchanged manner, as an HTTP header, so as to further exchange each time the browser 28 accesses the remote server 18 during the concerned communication session.

The remote server 18 has to verify, during a communication session initiated with the browser 28, the presence of the cookie and possibly its associated value within data received from an interlocutor, so as authenticate the browser 28, as its single authorized interlocutor.

The cookie generated by the remote server 18 is to be used only for one communication session, i.e. when the remote server 18 further receives the cookie originating from the browser 28, the remote server 18 checks a presence of the cookie and possibly its associated value and allows to further communicate with the browser 28 when the cookie is present and its associated value is the generated cookie value. Otherwise, i.e. when the remote server 18 has detected that the cookie is not present and/or its associated value is not the generated cookie value, the remote server 18 forbids from further communicating with the browser 28.

The remote server 18 sends back, as response to the received request 218, to the browser 28 data 220, like an HyperText Markup Language (or HTML) page, accompanied with executable data, such as a javascript, for downloading data from the local server 210 and, as parameters, the first URL relating to the local server 210, the second URL relating to the remote server 18, the first key, the second key, and possibly the validity time period value.

The data 220 includes a request for setting a cookie, so that, once the browser 28 receives the cookie, the browser 28 adds the cookie, as second key, within each further data to be exchanged either directly with the remote server 18 or indirectly, i.e. through the application 24 for accessing a server with the remote server 18.

Alternatively, instead of accompanying the HTML page and the executable data, the first URL relating to the local server 210, as parameter, the executable data comprises the first URL relating to the local server 210, so as to launch an execution of the application 24 for accessing a server.

The phone browser 28 interprets and executes the executable data by using the accompanied parameters.

If the browser 28 receives, within the executable data of the response originating from the remote server 18, a request for determining an expiration time value corresponding to the validity time period value, then the browser 28 executes the executable data while determining a corresponding expiration time value by adding to the time value at which the browser 28 received the response the validity time period value. Then, the browser 28 sends back to the remote server 18, as response to the request for determining an expiration time value corresponding to the validity time period value, another request (not represented) for downloading data relating to the remote server 18, such as "HTTP GET", accompanied with the first URL relating to the local server 210, the second URL relating to the remote server 18, the first key and the determined expiration time value, as parameters. The remote server 18 generates another cookie, as another second key, as data relating to rights for accessing the remote server 18, associated with the determined expiration time value. The remote server 18 sends back to the browser 28, as a response (not represented) to the received request, data, like an HTML page, accompanied with executable data, such as a javascript, for downloading data from the remote server 18 and as parameters, the first URL relating to the local server 210, the second URL relating to the remote server 18, the first key, the second key and the associated expiration time value.

It is to be noted that the remote server 18 sends the data 220, in response to the request 218 for downloading data relating to the remote server 18 accompanied with parameters, via the phone OS 26 (not represented), to the browser 28.

Then, the browser 28 sends, via the phone OS 26, the card OS 22 and local server 210, to the application 24 for accessing a server, also termed servlet when developed in Java or Javacard, a request 222 for downloading data relating to the local server 210 accompanied with the second URL relating to the remote server 18, the first key and the second key, as data relating to rights for accessing the remote server 18.

In a preferred embodiment (as represented), the application 24 for accessing a server is addressed by the browser 28, as a single application 24 for accessing a server. The application 24 for accessing a server plays a role of an applet for sending to the phone OS 26 a command 214 for launching a Web browser and a role of a servlet for receiving from the browser 28 a request 222 for downloading data relating to the local server 210.

According to another embodiment (not represented), the application 24 for accessing a server is not addressed by the browser 28 but another application (not represented) for accessing a server. The application 24 for accessing a server plays a role of an applet for sending to the phone OS 26, a command 214 for launching a Web browser and another application plays a role of a servlet for receiving from the browser 28 a request 222 for downloading data relating to the local server 210.

After a receipt of the request 222 for downloading data relating to the local server 210, the application 24 for accessing a server verifies whether data originating from the browser 28 matches the first generated key stored by the card 14.

If the data originating from the browser 28 does not match the first generated key, then the local server 210 does not authorize to continue a process for accessing the remote server 18, as another server.

On the contrary, i.e. if the received data originating from the browser 28 matches the first key, then the local server 210 generates a third key, as data relating to rights for accessing the remote server 18.

To generate the third key, the application 24 for accessing a server preferably uses a third key generation algorithm.

The third key generation algorithm takes preferentially into account at least the first key and the cookie, as second key.

To enhance the security level for accessing the remote server 18 to be accessed, the third key generation algorithm takes also into account preferably another key, as a fourth key.

The fourth key may be shared between the application 24 for accessing a server and the remote server 18.

The third key generation algorithm may be a concatenation function that concatenates the first key, the second key and the fourth key. The third key generation algorithm may be a cryptographic Hash function of the first key, the second key and the fourth key, as Input, so as to generate a corresponding Hash value.

The third key generation algorithm may be further complicated by using a private key, as the fourth key. The private key may be used to encrypt the first key and the second key, while using an algorithm like AES, as known per se, or another cryptographic algorithm.

The fourth key may be shared and common data known only to the application 24 for accessing a server and the remote server 18, as shared key, by using a Pre-Shared Key (or PSK) mechanism. The PSK is a shared secret which was previously shared between the two parties by using some secure channel before the shared key needs to be used.

Alternatively, instead of using the PSK mechanism, the fourth key is sent to the card user either via an encrypted message, like an SMS message or via a post-mail intended to the card user that has to use the fourth key to configure the card 14.

Alternatively, the fourth key is stored within the card 14 either before issuing the card 14 from a card manufacturer or after issuing the card 14 during a remote administration of the card 14 from a server managed by a service provider that either also manages the remote server 18 to be accessed or on its behalf.

Alternatively, instead of being a shared key, as fourth key, the fourth key is a private/public key relating to a Public Key Infrastructure (or PKI) mechanism, as known per se. The PKI mechanism is an arrangement that binds public keys with respective user identities by means of a certificate authority. The PKI mechanism may use a Secure Hash Algorithm (or SHA), like SHA-1, as known per se, so as to obtain a signature of the third key.

Optionally, the application 24 for accessing a server deletes the first key.

Optionally, the card application 24 for accessing a server authenticates the card user, so as to increase the security level for accessing the remote server 18. To authenticate the card user, for example, the card 14 verifies that data input by the card user effectively matches the PIN or the finger print of the card user previously defined by the card user and stored within the card 14.

The card 14 has generated the third key and the server to be accessed is the remote server 18, the card 14 has, for example, previously sent to the remote server 18, a message, such as a SMS message or an email, comprising the third key preferably, in an encrypted manner, so as to share with the remote server 18 the third key. An encryption algorithm for encrypting the third key is, for example, a Data Encryption Standard (or DES), 3 DES (acronym for Triple DES), Advanced Encryption Standard (or AES), or RSA (acronym for Rivest Shamir Adleman) algorithm.

When sent through an SMS message, the third key is, in an inherent manner to the transmission of an SMS message, transmitted in an encrypted manner.

Alternately, instead of sending the third key (in an encrypted manner or not), the card 14 sends to the remote server 18 a message with data for determining the third key, such as data relating to a third key generation algorithm identifier (among several possible key generation algorithms) and corresponding input data to be used, so as to generate a third key in a common manner between the application 24 for accessing a server and the remote server 18.

Preferably, the first, second and third keys are independent of each other.

Then, the application 24 for accessing a server sends back, in response to the last request 222 for downloading data relating to the local server 210, via the local server 210, the card OS 22, and the phone OS 26, to the browser 28 data 224, like an HTML page, accompanied with executable data, such as a javascript, for downloading data from the remote server 18 and as parameters, the second URL relating to the remote server 18, the third key and the cookie including the second key.

The phone browser 28 sends to the remote server 18 a request 226 for downloading data accompanied with the third key and the second key, as data relating rights for accessing the remote server 18.

It is to be noted that the browser 28 sends the request 226 for downloading data relating to the remote server 18 accompanied with the third key and the second key, as data relating rights for accessing the remote server 18, via the phone OS 26 (not represented), to the remote server 18.

The remote server 18 (sharing the third key with the card 14) analyses whether the received data relating to rights for accessing the remote server 18 matches the third key.

If the received data relating to rights for accessing the remote server 18 does not match the third key, then the remote server 18 does not authorize to continue a process for accessing the remote server 18 and, therefore, does no more communicate neither with the browser 28 nor with the card 14.

On the contrary, i.e. if the received data relating to rights for accessing the remote server 18 matches the third key, then the remote server 18 analyses whether the received data relating to rights for accessing the remote server 18 also matches the second key.

If the received data relating to rights for accessing the remote server 18 does not match the second key, then the remote server 18 does not authorize to continue a process for accessing the remote server 18 and, therefore, does no more communicate neither with the browser 28 nor with the card 14.

On the contrary, i.e. if the received data relating to rights for accessing the remote server 18 also matches the second key, then the remote server 18 authorizes to continue a process for accessing the remote server 18.

Once the remote server 18 has analysed whether the received data originating from the browser 28 matches the third and second keys, the remote server 18 sends back to the browser 28 data 228, as response to the last request 226 for downloading data with the second and third keys and analysis result, such as a code when the analysis result is successful and another code when the analysis result is unsuccessful.

It is to be noted that the remote server 18 sends the data 228, as response to the last request 226 for downloading data accompanied with data with the second and third keys, via the phone OS 26 (not represented), to the browser 28.

The card 14 has thus launched a process that allows to check an origin of an access request to the remote server 18, before entering into a communication session between the phone 12 (and more exactly the Web browser, as GUI, implemented by the phone 12) and the remote server 18.

The card 14, and more exactly the application 24 for accessing a server through the local server 210, as an intermediary software element, ensures a secure access to the remote server 18 without needing that the user be involved (i.e. when the user does not have to input data, such as a PIN, a finger print or other personal data checked by the card 14) while ensuring that the access to the remote server 18 is valid only once (since the first and second keys are generated and checked at one time).

A communication session between the card user and the remote server 18 has been initialized in a secured manner while involving the card 14 for authorizing (or not) the card user to interact, in a secured manner, through the browser 28, with an application executed on the remote server 18 to be accessed.

There is no need of user login information to access the remote server 18 to be accessed.

The initialization of the communication session is secure since the card 14 is at the root of a launching of the browser 28 to access the remote server 18 to be accessed.

Once the browser 28 execution has been securely launched, the phone browser 28 may go ahead in a further communication with the remote server 18 while implementing, further to the initialization of the communication session, possibly on a double submit cookie based mechanism. The double submit cookie is known per se, notably on Jul. 6, 2010, from the following site: "http://www.owasp.org/index.php/Cross-Site_Request_Forgery_%28CSRF%29_Prevention_Cheat_Sheet#Double_Submit_Cookies".

As soon as the expiration time value has been reached, the browser 28 (and therefore the card user) has to re-start the method for accessing the remote server 18.

As a matter of fact, the cookie, as the second key, is no more valid and the browser 28 is therefore no more authenticated when the browser 28 addresses the remote server 18 with the second key.

A lot of amendments of the embodiment described supra may be brought without departing from the spirit of the invention. For example, instead of three keys and two servers, a single key is possibly generated and sent by the card 14 to initiate an access to a remote or local server, as one and the same server.

The invention claimed is:

1. A secure element for accessing a second server, the secure element:
   comprising means for processing data;
   being configured to be coupled or connected to a host device, the host device including a browser; and
   being configured to send a command to the host device for launching the browser, as a browser launching command,
   wherein the secure element is configured to generate data for accessing the second server, the browser launching command is sent at an initiative of the secure element, wherein the browser launching command comprises: (i) a first Uniform Resource Locator ("URL") relating to a first server, as a proxy server, the first server being a local server, the local server being embedded within the secure element (ii) a second URL relating to the second server, the second server being the server to be accessed by the secure element, and (iii) the data relating to rights for accessing the second server, and
   wherein the secure element is configured to verify whether data originating through the first server from the browser matches the data relating to rights for accessing the second server, and only if the data originating through the first server from the browser matches the data relating to rights for accessing the second server, the first server authorizes continued access to the second server.

2. The secure element to claim 1, wherein, prior to sending the browser launching command, the secure element is configured to receive data through or from the host device.

3. The secure element according to claim 1, wherein the secure element comprises means for generating data to be used for determining the data relating to rights for accessing the second server.

4. The secure element according to claim 1, wherein the secure element comprises at least one of a means for processing data, a means for receiving a message and a means for authenticating a user, and wherein the secure element is configured to initiate a generation of data to be used for determining the data relating to rights for accessing the second server, once the means for processing data processes data, the means for receiving a message receives a message and/or the means for authenticating a user successfully authenticates a user.

5. The secure element according to claim 1, further comprising means for encrypting the data relating to rights for accessing the second server before sending the data.

6. The secure element according to claim 1, wherein the secure element comprises:
   means for receiving data;
   means for verifying whether the received data matches the sent data relating to rights for accessing the second server;
   means for generating a validity time period value during which the data relating to rights for accessing the second server is valid;
   means for sending the generated validity time period value and the data relating to rights for accessing the second server while sending a command for generating an expiration time value corresponding to an expiration of the generated validity time period;
   means for receiving the data relating to rights for accessing the second server and the expiration time value;
   means for generating other data relating to rights for accessing the second server or a third server; and
   means for sending the other generated data relating to rights for accessing the second server or the third server and an expiration time value for a period during which the other generated data relating to rights for accessing the second server or the third server is valid.

7. The secure element according to claim 6, wherein the secure element comprises means for sending a command for generating a cookie to be provided with the other generated data relating to rights for accessing the second server or the third server, so as to have an authorization for accessing the second server or the third server.

8. The secure element according to claim 7, wherein the means for receiving data comprises means for receiving data from the second server and the received data is data received from the second server.

9. The secure element according to claim 1, comprising:
   an application for accessing the second server,
   wherein the first server is an intermediary entity between the application and the browser.

10. A system for accessing a second server, the system comprising:
    a host device and a secure element, the secure element being coupled to the host device, the host device including a browser,
    wherein the secure element is configured to generate data for accessing the second server,
    wherein the secure element is configured to send, at an initiative of the secure element, to the host device, a command for launching the browser, as a browser launching command, wherein the browser launching command includes: (i) a first Uniform Resource Locator ("URL") relating to a first server, as a proxy server, the first server being a local server, the local server being embedded within the secure element, (ii) a second URL relating to the second server, the second server being the server to be accessed, and (iii) the data relating to rights for accessing the second server, and
    wherein the secure element is configured to verify whether data originating through the first server from the browser matches the data relating to rights for accessing the second server, and only if the data originating through the first server from the browser matches the data relating to rights for accessing the second server, the first server authorizes continued access to the second server.

11. The system of claim 10, wherein the p secure element comprises an application for accessing the second server and the first server is an intermediary entity between the application and the browser.

12. A method for accessing a second server in a system wherein a secure element is coupled to a host device that includes a browser, comprising the steps of:
generating, by the secure element, data for accessing the second server;
sending, by the secure element and at an initiative of the secure element, to the host device, a command for launching the browser, as a browser launching command, wherein the browser launching command includes: (i) a first Uniform Resource Locator ("URL") relating to a first server, as a proxy server, the first server being a local server, the local server being embedded within the secure element, (ii) a second URL relating to the second server, the second server being the server to be accessed, and (iii) the data relating to rights for accessing the second server;
verifying, by the secure element, whether data originating through the first server from the browser matches data relating to rights for accessing the second server; and
authorizing, by the first server, continued access to the second server only if the data originating through the first server from the browser matches the data relating to rights for accessing the second server.

13. The method according to claim 12, wherein, prior to sending the browser launching command, the secure element receives data through or from the host device.

14. The method according to claim 13, wherein the secure element receives, from the host device, an event, as data.

15. The method according to claim 12, wherein the secure element comprises an application for accessing the second server and the first server is an intermediary entity between the application and the browser.

* * * * *